INVENTOR
E. RAY TAGGART
BY
ATTORNEY

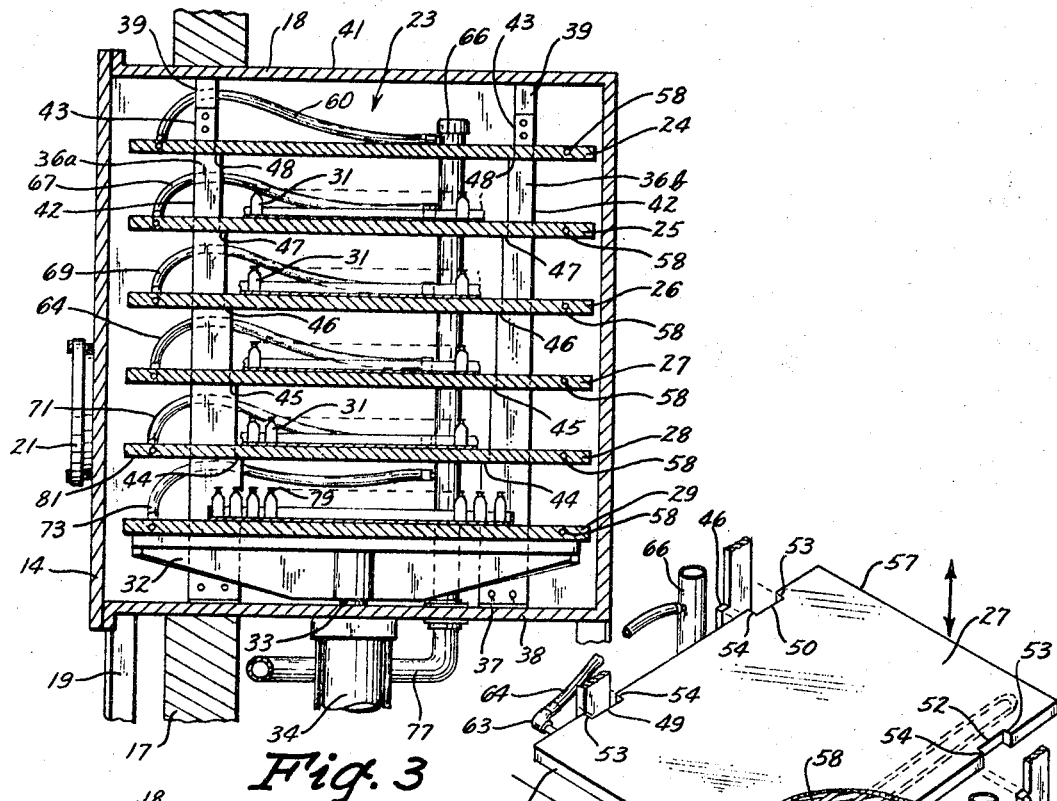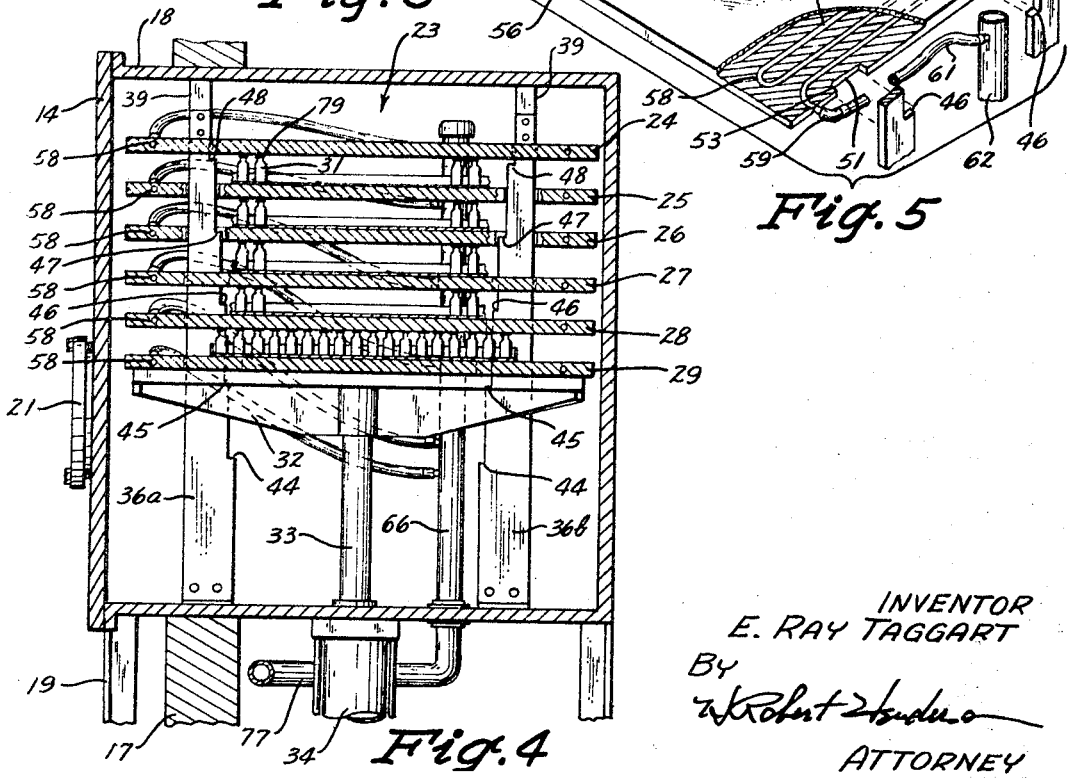

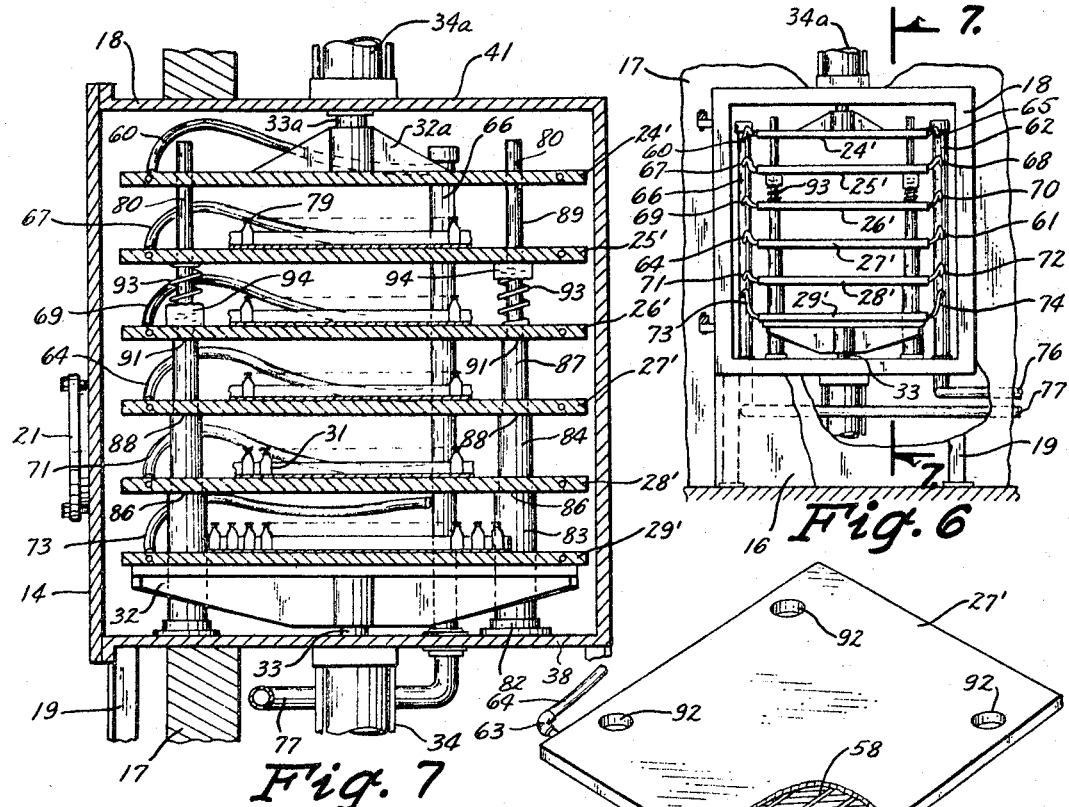
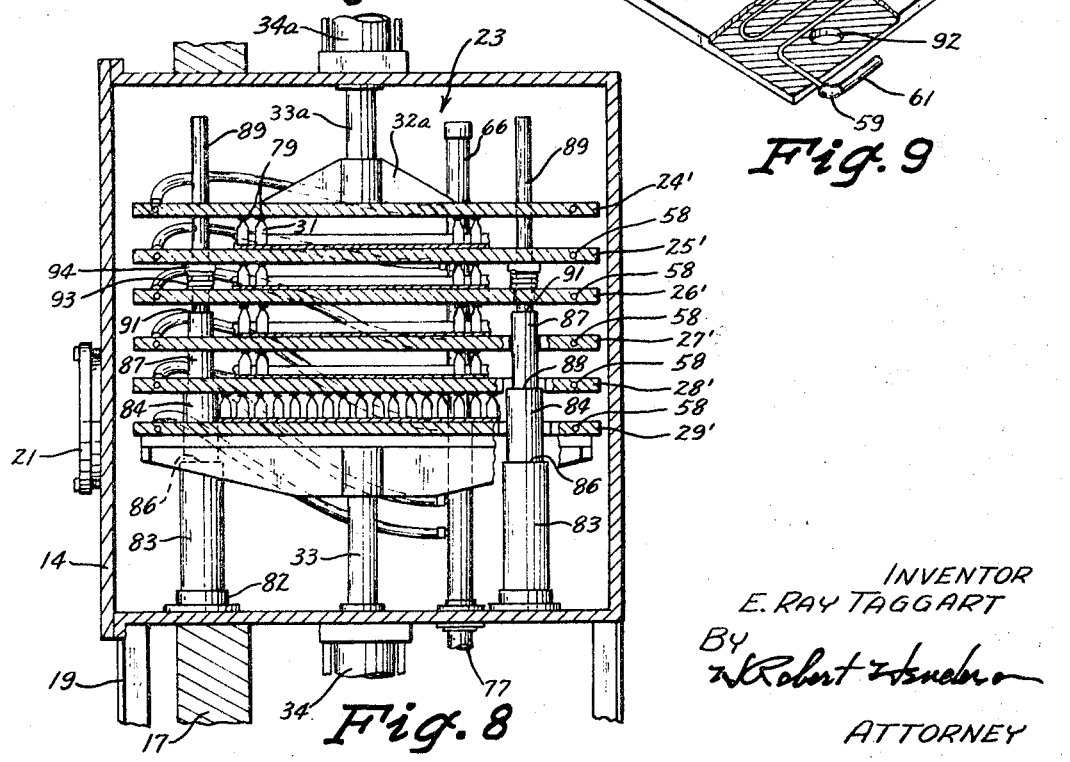

United States Patent Office 3,448,556
Patented June 10, 1969

---

3,448,556
APPARATUS FOR PRESERVING BIOLOGICAL AND LIKE PREPARATIONS
Everett Ray Taggart, 5176 SE. 40th St.,
Des Moines, Iowa 50320
Filed Dec. 6, 1965, Ser. No. 511,706
Int. Cl. B67b 3/24; B65b 63/08; F26b 5/06
U.S. Cl. 53—102                                    4 Claims

---

ABSTRACT OF THE DISCLOSURE

This invention comprises a desiccator apparatus including a vacuum chamber in which at least a trio of vertically movable plates are mounted in vertically spaced positions for holding separate containers therebetween in which materials can be treated, and wherein means are provided for vertically moving the uppermost plate downwardly and the lowermost plate upwardly to effect a stoppering of the containers therebetween, the means operable then to retract the plates to their initial positions for insertion of new containers to be stoppered.

---

This invention relates to the process and apparatus for preserving a substance for future use, and particularly to the lyophilization process conventionally termed freeze-drying.

Although lyophilization of biologicals and pharmaceuticals is known, and although the vacuum capping of bottles containing the substance is also known, the combination of the two processes, and the provision of a novel and simplified apparatus for accomplishing the combination has not been devised.

It is, therefore, an object of this invention to provide a new and useful apparatus for freeze-drying and vacuum bottling biological and pharmaceutical substances substantially simultaneously.

It is another object of this invention to provide a new and useful single process of freeze-drying and vacuum packing either or both biological and pharmaceutical substances.

Another object of this invention is the provision of a closed container within which the process of desiccation is carried out on a material, and simultaneously within which vacuum packaging of the material occurs, the process being accomplished within the same container without removing or otherwise disturbing the material.

Yet another object of this invention is the dehydration of a partially enclosed substance, and wherein the substance is vacuum packed while in the dehydrated state of approximately 2% moisture content.

Still another object of this invention is the utilization of the process in a mass application structure, wherein mass packing of the substance in a plurality of separate containers is provided.

It is another object of this invention to provide an apparatus capable of dehydrating a substance by freeze-drying, and within which are a plurality of shelves for holding a plurality of loosely capped bottles within which the substance is placed, wherein further the shelves are movable relative to each other for effecting an automatic, final capping of the bottles.

Yet another object of this invention is the provision of an apparatus as defined hereinbefore, and wherein the shelves have a three fold function: first, they support the desiccant holding bottles within a vacuum chamber; secondly, they act to compress the bottle caps to a fully closed position; and thirdly, they function to maintain the temperature within the vacuum chamber at predetermined levels.

Another object of this invention is to provide an apparatus and method capable of attaining the above designated objectives which are simple, economical, and effective.

These objects and other features and advantages of this invention will become readily apparent upon reference to the following description, when taken in conjunction with the accompanying drawings, wherein:

FIG. 3 is a sectional view as taken along the lines 3—3 in FIG. 2 and showing the shelf plates in their expanded condition;

FIG. 4 is a view similar to FIG. 3, and showing the shelf plates in their contracted condition;

FIG. 5 is a fragmentary perspective view of a shelf plate, broken away for clarity of illustration;

FIG. 6 is a reduced view similar to FIG. 2 of a modified desiccator apparatus;

FIG. 7 is a sectional view as taken along the lines 7—7 in FIG. 6;

FIG. 8 is a view similar to FIG. 7 and showing the shelf plates in their contracted condition; and FIG. 9 is a fragmentary perspective view of a shelf plate as used in the modified apparatus.

Figure 1:
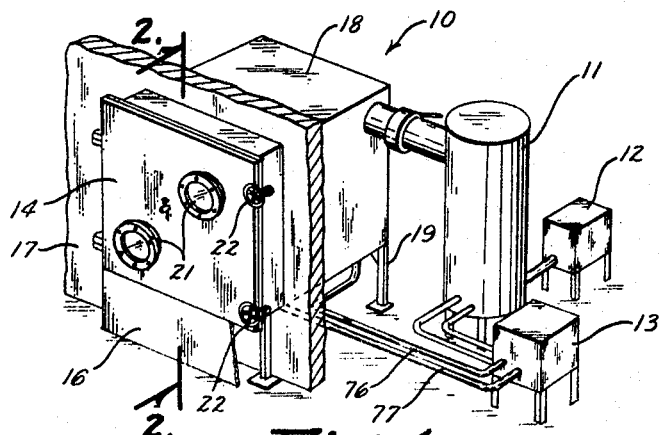
FIG. 1 is a perspective view of the desiccator apparatus of this invention shown in assembled relation with other components necessary for its operation.

Referring now to the drawings, and particularly to the embodiment of FIGS. 1–5, the desiccator of this invention is indicated generally at 10, and is fluidly connected by appropriate conduits and valving to a condenser unit 11, a vacuum pump unit 12, and a fluid refrigerant and heating unit 13. Normally, the hinged door 14 of the desiccator 10, accompanied for appearance by a base panel 16 is all that is exposed to the user, the remainder of the apparatus and units being available on the other side of a wall 17.

The desiccator 10 comprises a housing 18 (FIG. 2) of conventional box construction mounted on support legs 19. The hinged door 14 is provided with one or more viewing windows 21, and has hand wheel devices 22 for clamping the door 14 closed so as provide a fluid tight seal for the vacuum chamber 23 (FIG. 3) formed within the housing 18.

Arranged in vertically spaced and stacked relation within the chamber 23 (FIG. 3) are a plurality of flat right angular shelf-plates 24, 25, 26, 27, 28, and 29. Except for the top shelf plate 24, these are so named due to their dual function as shelves for supporting conventional vacuum bottle units 31 thereon, and as freeze-type plates for carrying a heat transmitting fluid therethrough, the purpose of which will be described hereinafter.

The base shelf plate 29 (FIGS. 2 and 3) is secured by a plurality of braces 32 to the upper end of a piston 33 reciprocally mounted in a fluid cylinder device 34. Controls (not shown) are provided for the operation of the desiccator for moving the base shelf plate 29 upwardly from its lower, inoperative position to the raised, operative position of FIG. 4.

Movement of the base shelf plate 29, and all other shelf plates is guided by a quartet of upright posts 36 (FIG. 2) arranged in a rectangular formation within the housing 18. The posts are identical, but each front and rear pair of posts are turned toward each other, as best indicated by posts 36a and 36b in FIG. 3. All four posts 36 are secured by angle-irons 37 (FIG. 2) to the bottom 38 of the housing 18, by brackets 39 to the top 41 of the housing 18.

Figure 2:
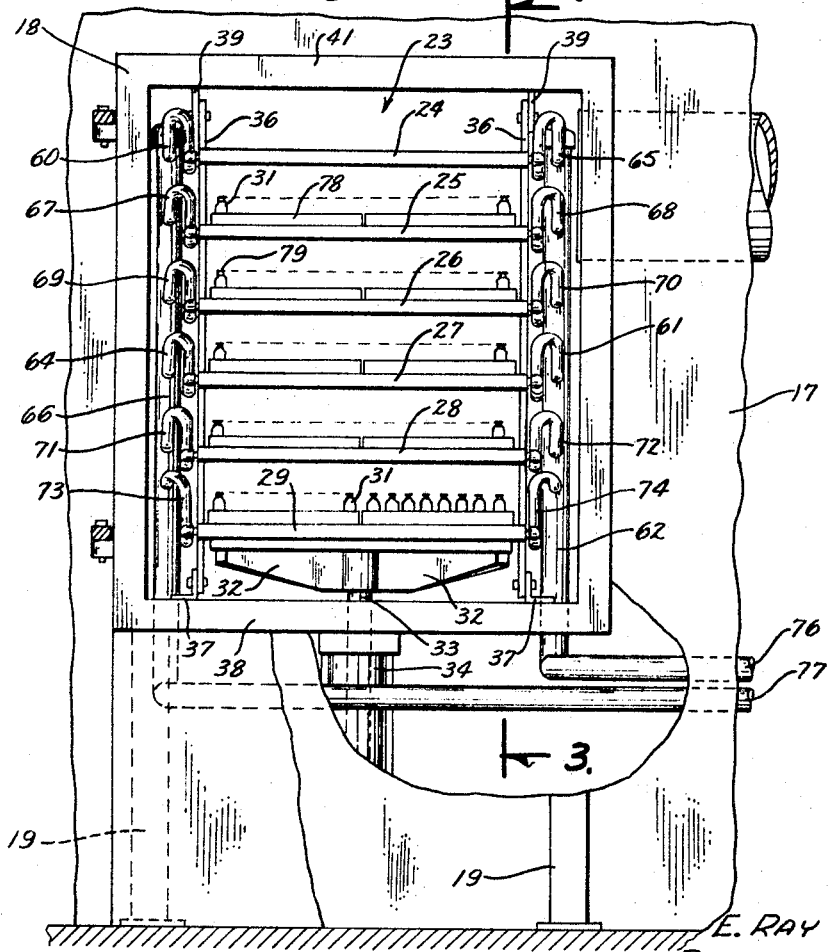
FIG. 2 is a view as seen along the lines 2—2 of FIG. 1 directly in front of the apparatus, with the front door thereof removed, and with other parts thereof broken away for clarity of illustration.

As best viewed in FIGS. 2 and 3, each post 36 is vertically disposed, perfectly straight and flat when viewed from the front (FIG. 2), and has an outer vertical straight edge 42 when viewed from the side (FIG. 3). The inner edge 43 has a plurality, specifically five, of shoulders 44, 45, 46, 47, and 48 formed by the width of the post progressively decreasing upwardly from the bottom thereof. It will be noted that each upright inner edge portion is vertical, extending parallel to that part of the outer edge 42 opposite thereof.

By this arrangement, and in cooperation with a quartet of notches 49, 50, 51, and 52 (FIG. 5) formed in each of the upper five shelf plates, the latter five plates are all freely supported on and movable relative to each other and to the base shelf plate 29. It can readily be seen that as the outer edges 42 (FIG. 4) of each pair of front and rear posts 36a and 36b are parallel their entire lengths, the complementary outer edge portion 53 of each pair of front and rear notches, specifically 49 and 50 (FIG. 5), and 51 and 52, are equidistantly spaced. Furthermore, the edge portions 53 of all notches for all six plates are vertically aligned for guide purposes.

Conversely, for support purposes as the shelf plate 28 is supported by the opposite shoulders 44, 44 (FIG. 3) on each transverse pair of posts, and as the next adjacent shelf plate 27 is supported by the shoulders 45, 45 on each transverse pair of posts 36, which are spaced farther apart than the shoulders 44, 44 due to the progressive upward narrowing of the posts 36, it can readily be understood that the front-to-rear length of each of the four notches for base shelf plate 29 is greater than the length of the same four notches for the plate 30.

Putting it another way, referring to FIG. 5 shelf plate 27 is illustrated. The length of each notch 49-52 is measured from each outer edge portion 53 to the inner edge portion 54 thereof, and with all notches 49-52 formed in shelf plate 27 being of identical length. Whereas, however, the longitudinal spacing of edge portions 53 inward from the front and rear edges 56 and 57 of each plate is the same, the longitudinal spacing of notch edge portions 54 inward from the front and rear edges of plate 27 is greater than the spacing of the notch edge portion 54 for plate 26, and the same relationship holds true for each next adjacent pair of plates up to the top shelf plate 24.

Therefore, each shelf plate can be moved upwardly on the posts 36 from their expanded-type, resting positions of FIG. 3 to their contracted-type operative positions of FIG. 4. When restting, top shelf plate 24 rests upon the four shoulders 48, shelf plate 25 upon shoulders 47, shelf plate 26 upon shoulders 46, shelf plate 27 upon shoulders 45, shelf plate 28 upon shoulders 44, and with the base shelf plate supported at the lower end of the posts 36 by the piston and cylinder arrangement. It will be noted in FIG. 3, that the normal vertical spacing between the shelf plates is sufficient for inserting and removing the bottles 31.

As all plates 24-29 are identical as to their interior construction, only one will be described, with all reference numerals pertinent as to the other plates. Referring to FIG. 5 it is seen that shelf plate 27 has a grid formation passage 58 formed therein, connected at one end by a fitting 59 to a flexible conduit 61 fluidly connected to an upright tube 62 (see FIG. 2) mounted in the chamber 23. Another fitting 63 connects the other end of the passage 58 to a flexible conduit 64 fluidly connected to another upright tube 66 mounted in the chamber 23 on the opposite side of the shelf plate 27 from the tube 62.

As best illustrated in FIG. 2, both tubes 62 and 66 are mounted on opposite sides of all the shelf plates, being fluidly connected by pairs of flexible conduits 60 and 65 to shelf plate 24, conduits 67, 68 to shelf plate 25, conduits 69, 70 to shelf plate 26, conduits 71, 72 to shelf plate 28, and conduits 73, 74 to shelf plate 29. Tube 62 is connected at its lower end to pipe 76, and tube 66 is connected at its lower end to pipe 77, with both pipes 76 and 77 running to the unit 13 (FIG. 1).

In operation of the desiccator apparatus 10 of FIGS. 1-5, with the shelf plates in their inoperative positions of FIG. 3, a plurality of bottles 31 (FIG. 2) are inserted into the cabinet 18 and placed on top of each of the shelf plates 25-29. The bottles 31 are shown placed in one or more trays 78, however this is discretionary. With the door 14 in a closed position and having a fluid-tight relationship with the cabinet 18 by means of the wheels 22 the vacuum pump unit 12 is operated to effect a vacuum within the chamber 23.

It should be noted, that prior to the introduction of a vacuum into the chamber 23, the bottles 31 are but partially stoppered into that their caps 79, of a conventional vacuum construction, are loosely placed within the open necks of the bottles 31. Thus, upon the placement of a negative pressure within the chamber 23, such negative pressure or vacuum is also introduced into the interior of the bottles 31. Within the bottles 31, a biological and/or pharmaceutical preparation has been placed, it being of course the object of the invention to dehydrate the preparation to a predetermined percentage of moisture content, then effect a closing or capping the bottles 31 such as to preserve the condition within the bottles.

With the attaining of a vacuum within the chamber 23, a refrigerated fluid, such as glycol, is circulated from the unit 13 through, for example, the pipe 76, tube 62, and the respective conduits connected thereto to the shelf plate passages 58. The flow continues through the opposite conduits, tube 66, and pipe 77 to the unit 13. This transmission of the liquid refrigerant effects a lowering of the temperature of the shelf plates and thus of the interior of the chamber 23 itself to a predetermined reading. By this process, sublimation of the moisture within the chamber 23 occurs.

After a predetermined period of time, the refrigerated glycol is removed from the shelf plate passages 58 and heated at the unit 13, whereupon it is again re-transmitted through the pipe 76 and conduits to the shelf plate passages 58, returning via the opposite plurality of conduits and pipe 77, effecting thereby a constant flow of heated fluid through the shelf plates. This results in a heating of said shelf plates and of the interior of the chamber 23 to a predetermined temperature. Subsequently, when the moisture content within the chamber 23 has been reduced to a predetermined amount, such as 2% moisture content, the heating fluid is removed from the shelf plate passages 58.

At this point, the piston and cylinder arrangement is operated to effect an upward movement of the base shelf plate 29. As the bottle caps 79 on the bottles 31 of the base shelf plate 29 engage the undersurface 81 (FIG. 3) of the next adjacent shelf plate 28, the weight of the latter effects a complete closing of the caps 79 into the bottles 31. Simultaneously, the structural stability of the bottles 31 on the base shelf plate 29 are sufficient to lift the shelf plate 28 upwardly, carrying with it the bottles 31 placed thereon.

It can thus be seen, that as the bottles on each succeeding shelf plate engage the undersurface of the shelf plate thereabove, first the bottle caps are completely closed into the bottles, and subsequently the bottles act as a force transmitting means upwardly from shelf plate to shelf plate to effect a continual, progressive, upward lifting of each plate. Referring to FIG. 4, it is seen that when the piston 33 is at its upper limit, all six shelf plates 24-29 have been raised to effect a closing by all caps 79 of all bottles 31 intermediate said six plates.

Furthermore, the top shelf plate 24, which is a floating shelf plate, has also been raised somewhat from the shoulders 48 upon which it normally rests. This is due to the necessity of the top shelf plate 24 having the capability of movement due to the passage therethrough of refrigerating fluid and of heating fluid effecting a contraction and expansion of the plate. Therefore, the upper top shelf plate 24 must be free to move.

When all of the bottles 31 have been properly capped by the condition of the shelf plates as best shown in FIG. 4, the piston 33 and cylinder 34 are actuated to lower the shelf plate 29' to its FIG. 3 position, the remaining shelf plates moving downward by gravity to their positions of FIG. 3. Upon the withdrawal of the vacuum from the chamber 23, the door 14 is opened to permit removal from the desiccator housing 18 of the bottles 31.

Referring now to the drawings FIGS. 6–9 inclusive, a modification of the apparatus of FIGS. 1–5 inclusive specifically is illustrated, with all like parts being indicated by like reference numerals.

Arranged within the housing 18 in vertically spaced and stacked relation are a plurality of flat, right-angular shelf plates 24', 25', 26', 27', 28', and 29'. Again, except for the top shelf plate 24', these are so named due to their dual function as shelves for supporting conventional vacuum bottle units 31 thereon, and as freeze-type plates for carrying a heat transmitting fluid therethrough for the same reason as set forth with respect to the embodiment of FIGS. 1–5.

The base shelf plate 29' (FIGS. 7 and 8) is secured by a plurality of braces 32 to the upper end of the piston 33 reciprocally mounted in a fluid cylinder device 34. Controls (not shown) are provided for the operator of the desiccator for moving the base shelf plate 29' upwardly from its lower, inoperative position of FIG. 7 to the raised, operative position of FIG. 8. Movement of the top shelf plate 24' simultaneously with the base shelf plate 29' is effected by the provision of a fluid actuated cylinder 34a and piston 33a arrangement mounted at the top of the housing 18 and connected by braces 32a to the upper surface of the top shelf plate 24'. The controls (not shown) for the upper piston and cylinder arrangement are combined with those for the lower arrangement for providing simultaneous operation.

Movement of the base shelf plate 29, and all other shelf plates, is guided by a quartet of upright, cylindrical posts 80 (FIG. 7) arranged in a rectangular formation within the housing 18. All four posts 80 are identical, and are secured by base plates 82 to the bottom 38 of the housing 18.

As best viewed in FIGS. 7 and 8, each post 80 is vertically disposed, and has a lower portion 83 of a constant diameter separated from an adjacent upper portion 84 of a lesser constant diameter, said separation by a shoulder 86. The portion 84 is separated from the next upper adjacent portion 87 which has a diameter less than the portion 84 forming thereby another shoulder 88, and with the portion 87 being separated from an upper portion 89 of a constant diameter less than the diameter of 87, and forming thereby yet another shoulder 91 therebetween.

To cooperate with the post 80, so as to provide vertical reciprocal movement of the shelf plates 24'–29', a plurality, specifically four in number, of circular openings 92 (FIG. 9) are formed in each shelf plate so as to be in alignment with the four posts 80. It will be noted, that the openings 92 of shelf plates 24', 25', and 26', are identical as to diameter, being slightly greater than the diameter of the post portion 89 thereby enabling these three shelf plates to move reciprocally thereon, but with the size of the openings in the lowermost shelf plate 26' smaller than the diameter of the post portion 87 enabling the shelf plate 26' to rest upon the shoulders 91.

The openings 92 formed in the shelf plate 27, are of sufficient diameter to permit movement of the shelf plate 27' upwardly of the post portion 87, but with said openings 92 smaller than the diameter of the post portion 84 whereby said shelf plate 27' rests upon the shoulders 88. Similarly, the openings 92 formed in the shelf plate 28' are sufficiently greater than the diameter of the post portion 84 to permit said shelf plate reciprocating thereon, but with the diameter of said openings 92 in the shelf plate 28' being smaller than the diameter of the post portion 83, whereby in the inoperative position of the plate 28' as best shown in FIG. 7, said shelf plate 28' rests upon the shoulders 86. Furthermore, the openings 92 formed in the shelf plate 29' are sufficiently large to permit said shelf plate to reciprocate upon the post portion 83.

In the inoperative position of the shelf-plates as best shown in FIG. 7, the top shelf plate 24' is of course held in its position by means of the upper piston and cylinder arrangement. The next adjacent lower shelf plate 25' is held in its position spaced intermediate the shelf plates 24' and 26' by means of a plurality of springs 93, mounted on the plate 26' and covered with a flexible housing 94, said springs 93 embracing the post portions 89 between the plates 25' and 26'.

The shelf plate 26' is supported upon the shoulders 91, as the shelf plate 27' is supported upon the shoulders 88 of the posts 81. The next adjacent lower plate 28' is supported on the shoulders 86, and with the base shelf plate 29' being mounted in its position and maintained thereby by the lower piston and cylinder arrangement.

Referring to FIG. 9, it is seen that the shelf plate 27', as does each of the shelf plates 24'–29', has a grid formation passage 58 formed therein, connected at one end by a fitting 59 to a flexible conduit 61 fluidly connected to an upright tube 62 (FIG. 6) mounted in the chamber 23. Another fitting 63 (FIG. 9) connects the other end of the passage 58 to a flexible conduit 64 fluidly connected to another upright tube 66 mounted in the chamber 23 on the opposite side of the shelf plate 27 from the tube 62.

As best illustrated in FIG. 6, both tubes 62 and 66 are mounted on opposite sides of all the shelf plates, being fluidly connected by pairs of flexible conduits 60, 65 to shelf plate 24', conduits 67, 68 to shelf plate 25', conduits 69, 70 to shelf plate 26', conduits 71, 72 to shelf plate 28', and conduits 73, 74 to shelf plate 29'. Tube 62 is connected at its lower end to pipe 76, and tube 66 is connected at its lower end to pipe 77, with both pipes 76 and 77 running to the unit 13 (see FIG. 1).

Operation of the embodiment of FIGS. 6–9 is substantially identical to that described for the embodiment of FIGS. 1–5, with the exception of movement of the shelf plates 24'–29'. With the partially enclosed bottles 31 and their caps 79 interposed as best illustrated in FIG. 7, actuation of the upper and lower piston and cylinder arrangements results in substantially simultaneous movement of the top plate 24' downwardly, and of the base plate 29' upwardly.

The arrangement is such that the upper shelf plates 24' and 25' move downwardly against the bias of the springs 93, with the lower shelf plates 26'–29' moving upwardly. The results of such combined movements are exactly the same relative to securely capping the bottles 31 as described hereinbefore. Upon a return of both upper and lower piston and cylinder arrangements to their normal positions of FIG. 7, the lower shelf plates 26'–29' move downwardly, shelf plates 26', 27', and 28' by virtue of gravity, until assuming their inoperative FIG. 7 positions. Shelf plate 24' is of course raised due to the action of the upper piston 33a and the cylinder 34a arrangement, with shelf plate 25' being raised to its normal position of FIG. 7 by means of the springs 93 expanding to their normal condition. Otherwise, the process of dehydrating the biological or pharmaceutical preparation in the bottles 31 under a vacuum while the material is being frozen and then heated is the same as described hereinbefore.

Although a preferred embodiment and a modification thereof have been described and disclosed hereinbefore, it is to be remembered that various alterations and changes can be made thereto without departing from the true spirit

I claim:

1. A vacuum apparatus comprising in combination:
   cabinet means having a chamber formed therein;
   means in fluid communciation with said chamber for creating a vacuum therein;
   stoppering means mounted within said chamber including at least trio of normally horizontally disposed plates, said plates vertically spaced apart sufficiently to receive open-top bottles therebetween with vacuum caps loosely inserted in their tops; and
   means secured to said cabinet means for positively moving the uppermost and the lowermost of said plates in opposite vertical directions toward each other, whereby the uppermost pair of plates and said caps immediately below engage and said caps are securely seated in said tops, said plate moving means operable to separate said plates to permit removal of the bottles.

2. A vacuum apparatus as defined in claim 1, and further wherein said plate moving means includes a pair of co-operable vertical force directing units, one unit operable to force the lowermost plate upwardly, and the other unit operable to force the uppermost plate downwardly.

3. A vacuum apparatus as defined in claim 2, and further wherein resilient means are supported between said plates, and bias said plates apart toward their bottle receiving positions.

4. A vacuum apparatus as defined in claim 1, and further wherein said stoppering means comprises:
   a plurality of upright guide posts mounted in said chamber, said posts being circular and having a series of end-to-end constant diameter sections placed one on top of another, each higher section having a diameter less than the next lower section, whereby an annular shoulder is formed therebetween; and wherein
   each plate has a plurality of openings formed therein for receiving said posts, with the openings of the lowermost plate having a diameter such that said lowermost plate rests upon the lowermost shoulders, and with each respective higher plate openings of a lesser diameter enabling said respective plate to rest only upon the next higher set of shoulders.

References Cited

UNITED STATES PATENTS

| | | | |
|---|---|---|---|
| 2,792,678 | 5/1957 | Baldwin et al. | 53—101 |
| 3,022,619 | 2/1962 | Strong et al. | 53—106 |
| 3,286,366 | 11/1966 | Seligman | 53—102 X |
| 3,289,314 | 12/1966 | Porta | 34—92 |
| 3,292,342 | 12/1966 | Kapeker | 53—101 |

TRAVIS S. McGEHEE, *Primary Examiner.*

U.S. Cl. X.R.

34—92; 53—112